United States Patent [19]

Ooms

[11] Patent Number: 5,277,721
[45] Date of Patent: Jan. 11, 1994

[54] METHOD FOR MAKING MICROPOROUS MARKING STRUCTURES

[75] Inventor: Willem Ooms, Oegstgeest, Netherlands

[73] Assignee: Porelon, Inc., Cookeville, Tenn.

[21] Appl. No.: 880,831

[22] Filed: May 11, 1992

[51] Int. Cl.⁵ .............................................. B29C 41/02
[52] U.S. Cl. .................................... 156/64; 156/242; 156/245; 156/246; 156/277; 101/368; 101/391; 101/392; 101/401.1; 101/401.2; 101/401.3; 264/220; 264/225; 264/226
[58] Field of Search ................ 156/242, 245, 246, 277, 156/64, 250; 264/220, 225, 226, 227; 101/368, 391, 392, 401, 401.1, 401.2, 401.3

[56] References Cited

U.S. PATENT DOCUMENTS

| | | | |
|---|---|---|---|
| 1,753,932 | 4/1930 | Lobke | 101/401.1 |
| 2,571,397 | 10/1951 | Wells | 264/85 |
| 3,101,668 | 8/1963 | Leeds | 264/226 |
| 3,479,952 | 11/1969 | Bernardi et al. | 101/401.1 |
| 3,506,749 | 4/1970 | Weissman | 101/368 |
| 3,971,315 | 7/1976 | Hansen | 101/401.1 |
| 4,927,695 | 5/1990 | Ooms et al. | 428/159 |
| 5,049,432 | 9/1991 | Ooms et al. | 428/159 |

OTHER PUBLICATIONS

M&R Marking Systems, *The Disposable Chase System*, May 1, 1992, 2 pages.

*Primary Examiner*—Caleb Weston
*Attorney, Agent, or Firm*—Foley & Lardner

[57] ABSTRACT

A method for preparing a microporous ink-impregnated marking structure according to the invention involves use of a window-like frame instead of a conventional chase. The frame is placed on the upper face of the matrix board or mold so that the premix, containing ink, plasticizer and resin, is retained therein. The premix fills the cavities and excess premix forms a continuous layer over the cavities in the mold, with the edges of the layer retained by the frame. A layer of an ink-absorbent backing material is placed on the layer of premix, and the backing is covered with a plate. The assembly is heated with pressure to form a microporous, marking fluid impregnated structure having a relief pattern corresponding to the cavities, and then cooled. The marking structure can then be used to make self-inking hand stamps.

20 Claims, 1 Drawing Sheet

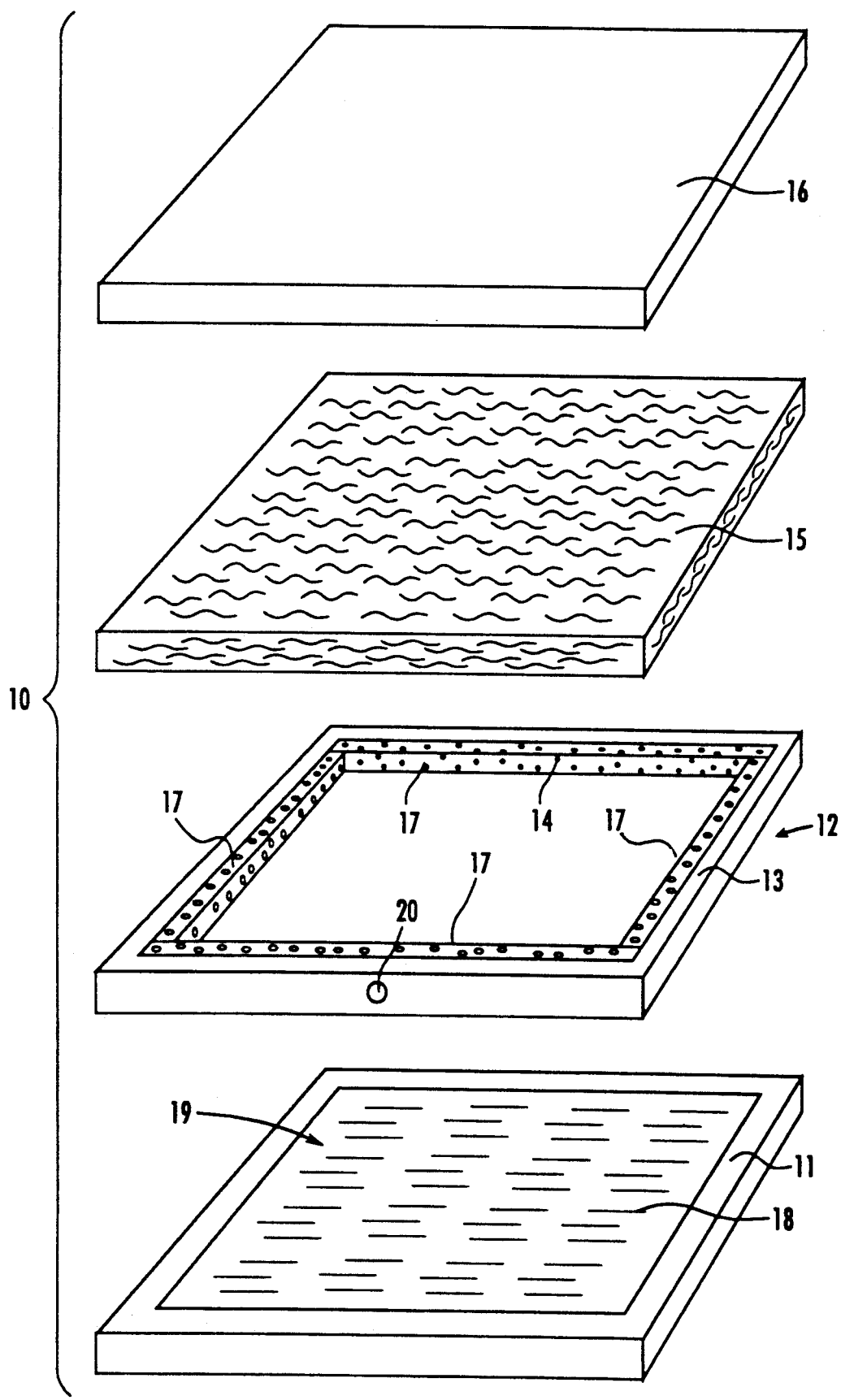

METHOD FOR MAKING MICROPOROUS MARKING STRUCTURES

FIELD OF THE INVENTION

This invention relates to an improved method for preparing marking structures such as hand stamps.

BACKGROUND OF THE INVENTION

Leeds U.S. Pat. Nos. 2,777,824 and 3,055,297 disclose marking structures made of highly porous plastic material, the pores of which are of microscopic proportions and are filled with a marking fluid such as an ink. Structures made in accordance with the teachings of the Leeds patents have experienced a high degree of commercial success as hand stamps, stamp pads, and also as ink rolls such as are used for applying ink to printing members in automatic printing equipment. Such structures are advantageous because of their long life, both in length of time and in numbers of operations or impressions, and because they operate well without the necessity of repetitive re-inking of the marking surface.

One problem with the method of making the marking structures disclosed in Leeds U.S. Pat. Nos. 2,777,824 and 3,055,297, is the time required to produce these structures. For example, in the case of hand stamps, the total processing time may be a period on the order of about 15 hours. A lengthy period of time is primarily required for a stabilization step in which the molded structure reaches an initial dimensional stability and excess ink flow from the structure is stabilized. One solution to this problem is to use an absorbent backing during molding that absorbs excess ink and thereby eliminates the need for a lengthy stabilizing step. See Ooms et al. U.S. Pat. Nos. 4,927,695 and 5,049,432, the contents of which are incorporated by reference herein.

However, a concern with the marking structures made using the disclosures of Leeds and Ooms et al. is that the process is complex and requires skilled workers and specialized equipment to produce acceptable marking devices. Known methods of making marking structures generally involve an initial step of making a mold having indentations or cavities corresponding to a relief pattern to appear on the marking structure. The mold, or matrix board, is essentially a flat plate having a rectangular indentation on one side.

Currently, premix molding requires a complicated, high-priced, machined metal chase, consisting of a bottom plate, middle frame, some of which have excess premix overflow channels, and a lid. The matrix board is put between the middle frame and bottom plate. Premix is poured onto the matrix board. The middle frame of the lid keeps the liquid premix from running out. The lid goes on top, and then the entire assembly is put into a heated press for molding. The overflow channels on the middle frame aid in draining of excess premix during the molding cycle. Before a new casting is made, the chase needs to be disassembled and cleaned using cleaning chemicals that are potentially damaging to the environment. This is a time consuming, messy operation. Often, the solvents used also present a fire hazard.

The present invention provides a molding method which addresses these problems by providing an alternative to the use of a molding chase.

SUMMARY OF THE INVENTION

A method for preparing a marking structure according to the invention involves use of a windowlike frame instead of a chase. The frame is placed on the upper face of the matrix board so that the premix is retained therein The outside dimensions of the frame are much smaller than those of the chase. This allows production of a large molded marking structure in a simple, low cost molding unit, as opposed to a bulky, expensive press. As a result, less work space is needed and equipment cost is significantly reduced.

According to one aspect of the invention, a method for preparing a marking structure includes steps of placing a premix containing a marking fluid in a mold having cavities defining a pattern so that the premix fills the cavities and excess premix forms a continuous layer over the cavities, with the edges of the layer retained by an open-centered frame corresponding in size to the desired molding, optionally placing a layer of a marking fluid-absorbent backing material on the layer of premix, then heating the premix, optionally with pressure, to form a microporous, marking fluid impregnated structure having a relief pattern corresponding to the cavities, and then cooling the microporous structure. The backing layer is positioned to absorb excess marking fluid from the microporous structure, and may be removed from the microporous structure once molding is completed, or left in place and incorporated in the finished stamp.

The frame preferably accommodates excess ink during the molding process. In a preferred embodiment of the invention, an absorbent stripping is put in the inside of the frame, against the frame. The premix is then put onto the matrix board and the ink is prevented from running out by the foam. This foam absorbs ink, functioning in a manner similar to the overflow channel of the chase, and also acts as an extension of the absorbent backing.

An apparatus for use in molding a microporous marking structure according to the invention accordingly includes a generally flat matrix board having cavities in one face thereof, an open-centered frame having the same peripheral shape as the matrix board, which frame fits about the cavities to form a mold, a layer of an ink-absorbent material having the same peripheral shape as the matrix board which fits over the mold, and a cover plate having the same peripheral shape as the matrix board which fits over the ink-absorbent layer. The frame may further comprise a first, outer rigid frame, and a second, inner frame made of an ink-absorbent material, such as a plastic foam, that may be adhesively secured to the matrix board.

BRIEF DESCRIPTION OF THE DRAWING

The invention will be further described with reference to the appended drawing, which is an exploded perspective view of an apparatus for molding a microporous marking structure according to the invention.

DETAILED DESCRIPTION OF PREFERRED EMBODIMENTS

Referring to the drawing, an apparatus 10 for molding a microporous marking structure includes a conventional matrix board or mold 11, a rectangular frame 12 including an outer frame 13 made of metal (e.g., aluminum) and an inner frame 14 made of a sealing material such as a foam. An absorbent backing layer 15 made of the same or different material from the inner frame 14 covers the premix and preferably the edges of inner frame 14. Finally, a metal cover 16 in the form of a flat aluminum plate is placed over backing 15 prior to molding. The stacked components can be placed in the press as is without need for clamps or similar devices for holding the assembled molding apparatus 10 by its edges. The frame and cover are free of means for securing the frame to the cover, so that the matrix board, frame, premix, backing and cover plate form a free standing stack or assembly.

It is not essential to bond inner frame 14 to outer frame 13 or to the matrix board 11 with an adhesive or otherwise, thereby eliminating the mess and cumbersome processing associated with use of a liquid adhesive. However, to reduce leakage between the surface of the matrix board and the foam, the inner frame can be made using commercially available weatherstripping foam, e.g. made of polyurethane or latex rubber foam preferably about 0.1 to 0.5 inch in thickness having an adhesive pre-applied to one face thereof, the sticky side being covered by a removable liner or release paper. The weatherstripping is cut to size and applied to the matrix board as four strips 17, as shown, to form a rectangle. The adhesive bonds the strips to the matrix board without the mess associated with applying a liquid adhesive. The sealing material used as the inner frame 14 may be non-ink absorbing, for example, made of a closed-cell foam, or may be ink-absorbing, e.g., made of an open-cell foam. The latter is often preferred because an ink-absorbing foam or similar material (see below) can act both as a seal and a means for absorbing excess ink during molding.

Outer frame 13, which provides strength that the compressible foam material lacks, has a comparable thickness, for example 0.1 to 0.5 inch. As an equivalent to the inner and outer frame system shown, frame 13 can also be made of a relatively rigid material having some absorbency, such as bristol board, chip board and similar materials of the type previously used as gaskets in prior molding systems.

Matrix board 11 can be made of a material which can partially absorb marking fluid from the finished marking structure, or can be non-absorbent; see the Ooms et al. patents cited above. The mold is preferably non-absorbent to the premix, i.e. does not absorb any marking fluid or resin. Molds made of impermeable phenol-formaldehyde resin are suitable for this purpose. A mold having an array of different messages or designs thereon for forming multiple hand stamps, called a matrix board, is conveniently used to improve productivity.

To prepare for molding, foam strips 17 are adhered to the upper face of matrix board 11 around its outer periphery (but slightly spaced therefrom) and adjacent an indented portion 19 of board 11 to form inner frame 14. Outer frame 13 is placed outside of inner frame 14.

A premix containing a thermoplastic resin and a marking fluid, such as an ink, is then placed on the matrix board in the space bounded by inner frame 14 to fill cavities 18 in indented portion 19 of board 11 and form a layer of premix thereon. The premix is poured to a total depth at least twice the thickness of the mold cavities used for forming characters. A wide variety of thermoplastic resins, particularly synthetic resins, are acceptable for use in the premix. Resins which fuse at a temperature below the boiling point of the marking fluid which is used therewith should be used. Examples of acceptable thermoplastic resins are: polyvinyl chloride, polyvinyl acetate, polyvinylidene chloride, polyvinyl butyral, cellulose acetate butyrate, polymethyl methacrylate, polymethyl acrylate, polysulfone, and copolymers and combinations thereof. Highly preferred resins include: polyvinyl chloride, polyvinyl acetate, polyvinylidene chloride, polyvinyl acetate, polyvinylidene chloride, copolymers of vinyl chloride and other ethylenically unsaturated monomers, and combinations thereof. The most preferred resins are copolymers of vinyl chloride and vinyl acetate.

A plasticizer is used in the premix in an amount of about 40 to 160 percent by weight of the resin. The plasticizer should soften the resin to allow the formation of aggregates which form the marking structures of the invention. Examples of suitable plasticizers for use with polyvinyl chloride, polyvinyl acetate, polyvinylidene chloride, copolymers of vinyl chloride and other ethylenically unsaturated monomers, or combinations thereof, include tricresylphosphate, dioctyl phthalate, dimethyl phthalate, dibutyl phthalate, butyl benzyl phthalate, trioctyl phosphate.

Backing 15 is then laid over the premix and frames 13, 14 in contact therewith. Backing 15 may be made of wool (woven, felted or needle-punched), cotton (woven or felted), urethane foam, polyvinyl chloride (PVC) foam, jute, hemp, cork, non-woven cellulose (including paper and cardboard), and fabrics of treated synthetic fibers (woven or non-woven) such as polyethylene, polypropylene, nylon, rayon, polyester, teflon, and fiberglass. Suitable urethane foams must be of the open cell type with interconnected pores to allow for fluid transfer. Backing 15 is preferably a wool felt should having a density within the range of from about 12 to 20 pounds per square yard, as described in the foregoing Ooms et al. patents. It has been found that sizing can be omitted for more consistent, denser grades of felt.

Backing 15 preferably has a thickness at least about equal to the thickness of the resulting ink-impregnated layer. Preferred thicknesses range from 0.075 to 0.335 inches. The preferred thickness for use in hand stamps is 0.1 to 0.15 inches. The thickness of the backing material, in general, is preferably sufficient to absorb at least 0.30 to 0.70 grams of marking fluid per square inch of back layer, particularly 0.40 to 0.50 $gm/in^2$. Absorbent frame 14 can have a similar level of absorption. Excessive absorption will shorten stamp life, while insufficient absorption can cause ink leakage and damage to the stamp during molding. The use of absorbent frame 14 can make it possible to reduce the required absorbency for the backing below these ranges. The backing and/or absorbent frame absorbs excess marking fluid from the microporous structure so that no lengthy stabilization or "blotting" step is needed after molding is completed.

The cover 16, a simple aluminum plate, is placed over the backing. This plate replaces the chase lid. No bottom plate is needed. The frame and cover are light, so that the length of the heating and cooling cycle can be shortened, and higher heating efficiencies can be attained.

The mold or matrix board is then heated to a high temperature, normally within the range of about 110°–150° C., for a sufficient period to form the microporous marking structure, normally about 5–50 minutes, depending primarily upon the size and shape of the marking structure being produced and the type of thermoplastic resin being used. During this molding process, the premix used to form the ink-impregnated marking structure can be partly absorbed into the backing layer. The aggregates of the ink-impregnated layer define a network of pores which is partially filled with the ink. As the premix is heated, it is preferably subjected to uniform pressure of at least about 0.5 ton, generally 1-2 tons, for not less than about 5 minutes, preferably at least 10 minutes. The pressure aids formation of the microporous structure and enhances bonding of the backing and microporous structure.

The backing layer and foam strips absorb excess ink from the ink-impregnated layer and allow molding to be carried out on a non-absorbent mold. Normally, if the mold has too little or too much absorbency, as determined by the particular formula of premix being used, the finished marking structure can be affected adversely, i.e. either has too much marking fluid left in it to be removed after molding, or has too little marking fluid and correspondingly reduced performance. The backing, in combination with the absorbent frame, eliminates problems encountered in practice with molds having inadequate ink absorption properties.

The marking structure is cooled to room temperature, by allowing the molding device 10 to stand at room temperature for a period of time, or by cooling using a cooling device. The molding device of the invention can, for example, be inserted between a pair of cooling platens through which cool water circulates. The casting is then stripped from matrix board 11, which is discarded along with inner frame 14. There is nothing to clean, so there are no environmental or fire hazardous solvents or cleaning agents. This method particularly reduces cleaning for fluorescent premixes which contaminate very easily. Some handstamp mounts require dies (microporous marking structures) of different thicknesses. The frame can be easily produced at a very low cost at any desired thickness.

Handstamps are presently made using a variety of different colored inks. Premixes for each color have different shrink rates. This forces users to shim the individual dies so they match in height. This very labor intensive step can be omitted by providing molding frames 13, 14 with a predetermined thickness as determined for each color, so that the dies come out the same thickness.

A small hole 20 may be drilled in the side of frame 12 to allow entry of a pyrometer probe through the hole. The probe penetrates the foam and enters the premix. This gives a much more accurate temperature reading than the procedure in current use with the chase, which measures the temperature of the chase middle frame, as opposed to the actual premix temperature.

The foregoing method can be used equally well with a removable type of backing now in commercial use wherein the backing includes a release sheet, such as a sheet of sandpaper, backed by a sufficient thickness of absorbent sheets. The latter absorb sufficient ink to avoid the need for a lengthy stabilization step. Use of a removable backing changes the die thickness. The method of the invention accommodates such a change without requiring purchase of an entire new chase. Further, conventional chases damage easily in use. The frame system of the present invention avoids these drawbacks.

The ink-impregnated microporous marking structure made according to the method of the invention is suitable for making a self-inking (self-replenishing) hand stamp. The open-celled, skinless nature of the microporous structure allows a small but generally constant flow of ink from the marking structure. Thus, as ink is removed from the surface of the relief pattern on the marking structure when an impression is made, ink from the interior of the marking structure flows to the surface in sufficient quantity to allow formation of further images having substantially the same brightness and clarity as the initial image.

The invention advantageously utilizes the ink-impregnated microporous marking structure as part of a hand stamp. As used herein, the term "microporous" means having an open-celled network of small interstices or voids both at the surface of a piece of material and throughout the interior thereof, i.e. remote from its surface. The material has pores small enough to prevent substantial bleed-out (leakage) of a marking fluid, i.e. small enough as to be not normally discernible by the naked eye, yet large enough to permit some flow therein of a marking fluid such as an ink as described hereinafter. For example, a material having an average pore size of less than about 100 microns in diameter and greater than about 0.5 microns in diameter functions well in this invention, although any properly selected pore size or distribution relative to the viscosity and ability of the fluid to wet the material may be suitably selected by those skilled in the art.

The micropores of the material described herein with particular reference to the exemplified embodiment are not necessarily either symmetrical or similar to each other in shape and size. Indeed, such pores are oftentimes otherwise quite irregular and varied in shape and size, and for this reason it may be difficult to determine the "diameter" of any given pore or the "average diameter" of pores of a particular material. Thus, average pore size as used herein generally refers to the average of the largest dimension of each such irregular pore.

The molded marking structure is typically cut into strips of suitable size for attachment to conventional hand stamp mounts. If backing 15 remains in place and becomes part of the finished hand stamp, a sealant layer is formed over it to prevent ink leakage, and the sealant layer is secured by suitable means, such as a layer of adhesive, directly to the inner surface of the mount. One suitable sealant is a plastisol of polyvinyl chloride in methyl ethyl ketone. The sealant layer can also be applied directly to the rear face of the microporous structure.

According to a preferred embodiment of the invention, the premix is made from a thermoplastic resin powder, such as polyvinyl chloride powder, which will pass through a 75 mesh screen, blended with a plasticizer, such as liquid dioctyl phthalate, forming a plastisol blend. A marking fluid such as ink, separately prepared from dyes, pigments, dye solvents and vehicles which are substantially incompatible with the resin, is added to the plastisol blend, preferably in a weight ratio of marking fluid to plastisol blend within the range of about 0.1-1.0. A preferred range for the ratio of ink to thermoplastic resin for the ink-impregnated layer is in the range of about 0.3-0.7. Within this range, a strong impression may be applied and strength of the material is good. Preferred premixes of this type are commercially available from Porelon, Inc.

The marking fluid used in this invention, in addition to being suitable for the intended purpose, must be incompatible with (non-solvent to) the thermoplastic resin used in the sense that such fluids must not substantially soften or dissolve such resins. An extremely wide variety of known marking fluids are acceptable. Inks are normally prepared from dyes, pigments, and dye solvents and vehicles. Such solvents and vehicles must not readily dissolve the resins. Examples include: alphabetic hydrocarbons, castor oil esters, ethanolamides, fatty acids, fatty acid esters, glyceryl esters, glycols, glycol esters, marine oils, mineral oils, polyethylene and polypropylene glycols, and vegetable oils. Dyes are generally used in such inks in amounts of from about 5–25 percent of total ink weight. The dyes, of course, must be soluble in the dye solvent used. Color pigments are normally dispersed in the vehicles used in amount of from about 2–20 percent of total ink weight. Particle sizes of the pigments must be small enough to pass through the micropores of the marking structure. Many suitable marking fluids and methods for preparing such fluids are known in the art.

EXAMPLE

A negative matrix board having a desired relief pattern is prepared using known methods such as the hot lead technique or photopolymer pattern plates. Four pieces of 0.25 inch thick 3M foam weatherstripping are applied, adhesive side down, along the outer periphery of the matrix board about 0.3 inch in from each edge. A 0.3 inch thick rectangular aluminum frame having essentially the same dimensions as the matrix board is then placed around the foam strips in contact therewith. A Porelon SP brand premix is carefully stirred and then about 12 g of premix is applied over the matrix board. The premix is carefully rubbed into the mold cavities to force out air and eliminate pin holes. The mold is then filled with an additional 30 g of premix to a total fill of about 42 g. A piece of ⅛" 16R1 felt impregnated with 6% wheat starch sizing, as a backing layer, is placed over the premix within the mold.

An aluminum plate is then placed over the absorbent backing layer, and the entire mold assembly is loaded onto a drip tray and placed into a press which has been preheated to 125° C. The press is then closed, and a force of 5 tons is applied for 12 minutes. At the end of the above time, the pressure is released and the mold is removed from the press and allowed to cool to room temperature. The mold assembly is disassembled and the casting is peeled away from the matrix board.

The casting is then cut into individual pieces for use as hand stamps and applied to conventional hand stamp mounts using an appropriate adhesive. It is preferred to seal the back of the backing layer with suitable sealers such as EC821 available from 3M Company, so that the plastic of the hand stamp frame may be bonded securely to the surface of the backing layer, and ink absorbed by the backing layer cannot contact the adhesive used to bond the hand stamp mount to the marking structure.

It will be understood that the above description is of preferred exemplary embodiments of the invention, and that the invention is not limited to the specific forms shown. Modifications may be made in the described methods and products without departing from the scope of the invention as expressed in the appended claims.

I claim:

1. A method for making a marking structure, comprising;
    placing an open centered frame onto a matrix board having cavities therein so that the frame surrounds the cavities;
    placing a premix containing a marking fluid on the matrix board so that the premix fills the cavities and excess premix forms a continuous layer over the cavities, with the edges of the premix layer retained by the frame;
    then placing a layer of a marking fluid-absorbent backing material on the layer of premix and covering the backing with a cover plate;
    heating the premix under pressure to form a microporous, marking fluid impregnated structure having a relief pattern corresponding to the cavities; and
    cooling the microporous structure.

2. The method of claim 1, wherein the premix comprises a plastisol consisting essentially of a thermoplastic resin, a plasticizer and the marking fluid, and the marking fluid is an ink.

3. The method of claim 2, wherein the resin is selected form the group consisting of polyvinyl chloride, polyvinyl acetate, polyvinylidene chloride, copolymers of vinyl chloride and other ethylenically unsaturated monomers and combinations thereof.

4. The method of claim 3, wherein the backing material is selected from the group consisting of wool, cotton, urethane foam, polyvinyl chloride foam, jute, hemp, cork, non-woven cellulose, synthetic fibers, and combinations thereof.

5. The method of claim 1, wherein the frame and cover are free of means for securing the frame to the cover, so that the matrix board, frame, backing and cover plate form a free-standing, stacked mold assembly during the heating step, and further comprising the steps of:
    disassembling the mold assembly; and
    peeling the microporous structure away from the matrix board.

6. The method of claim 5, wherein the heating step further comprises placing the matrix board, frame, premix, backing and plate in a preheated press, which press applies a pressure of at least about 0.5 ton on the premix.

7. The method of claim 6, wherein the heating step continues or at least about ten minutes on a matrix board which is non-absorbent to the ink.

8. The method of claim 1, wherein the step of placing the frame onto the matrix board further comprises adhesively bonding strips of a sealing material to the matrix board.

9. The method of claim 8, wherein the step of placing the frame onto the matrix board further comprises placing a rigid frame outside of the sealing material.

10. The method of claim 1, wherein the frame comprises a marking fluid absorbent material.

11. The method of claim 10, wherein the open-celled plastic foam has a layer of pre-applied adhesive on one side thereof, and the step of placing the frame onto the matrix board further comprises pressing the adhesive side of the foam against the matrix board.

12. The method of claim 10, wherein the premix comprises a plastisol consisting essentially of a thermoplastic resin, a plasticizer and the marking fluid, the marking fluid is an ink, and the absorbent material consists essentially of an open-celled plastic foam.

13. The method of claim 1, further comprising:
    drilling a small hole through the frame;
    inserting a pyrometer probe through the hole into the premix; and
    monitoring the premix temperature.

14. The method of claim 1, wherein the frame completely surrounds the matrix board cavities.

15. A method for making a marking structure, comprising:

placing an open centered, flexible inner sealing frame onto a matrix board having cavities therein so the the inner frame surrounds the cavities;

placing an open centered, rigid outer frame onto the matrix board outside of the inner frame;

placing a premix containing a marking fluid on the matrix board so that the premix fills the cavities and excess premix forms a continuous layer over the cavities, with the edges of the premix layer retained by the inner frame;

placing a layer of a marking fluid-absorbent backing material on the layer of premix;

covering the backing with a cover plate;

heating the premix under pressure to form a microporous, marking fluid impregnated structure having a relief pattern corresponding to the cavities; and cooling the microporous structure.

16. The method of claim 15, wherein the inner frame is made of an marking fluid-absorbent material that is effective to absorb excess marking fluid from the finished microporous marking structure.

17. The method of claim 16, wherein the marking fluid-absorbent material comprises an open-celled plastic foam.

18. The method of claim 15, wherein the premix is a plastisol consisting essentially of a thermoplastic resin and a plasticizer together with the marking fluid, the marking fluid is an ink, and the resin is selected from the group consisting of polyvinyl chloride, polyvinyl acetate, polyvinylidene chloride, copolymers of vinyl chloride and other ethylenically unsaturated monomers, and combinations thereof.

19. The method of claim 15, wherein the matrix board, outer frame, and cover plate form a free-standing, stacked mold assembly during the heating step, and further comprising the steps of:

disassembling the mold assembly; and peeling the microporous structure away from the matrix board.

20. The method of claim 15, wherein the outer frame is adjacent to and geometrically similar to the inner frame.

* * * * *

Adverse Decisions in Interference

Patent No. 5,277,721, Willen Ooms, METHOD FOR MAKING MICROPOROUS MARKING STRUCTURES, Interference No. 103,810, final judgment adverse to patentee rendered January 8, 1998, as to claims 9, 15-18 and 20.

*(Official Gazette April 21, 1998)*